US010099374B2

(12) United States Patent
Boesen

(10) Patent No.: US 10,099,374 B2
(45) Date of Patent: Oct. 16, 2018

(54) ROBOTIC SAFETY USING WEARABLES

(71) Applicant: BRAGI GmbH, München (DE)

(72) Inventor: Peter Vincent Boesen, München (DE)

(*) Notice: Subject to any disclaimer, the term of this patent is extended or adjusted under 35 U.S.C. 154(b) by 148 days.

(21) Appl. No.: 15/361,992

(22) Filed: Nov. 28, 2016

(65) Prior Publication Data

US 2017/0151668 A1    Jun. 1, 2017

Related U.S. Application Data

(60) Provisional application No. 62/261,779, filed on Dec. 1, 2015.

(51) Int. Cl.
| *B25J 9/16* | (2006.01) |
| *B25J 19/06* | (2006.01) |
| *F16P 3/14* | (2006.01) |
| *G05B 19/406* | (2006.01) |
| *G05B 19/4061* | (2006.01) |

(52) U.S. Cl.
CPC .......... *B25J 9/1676* (2013.01); *B25J 9/1674* (2013.01); *B25J 19/06* (2013.01); *B25J 19/061* (2013.01); *F16P 3/147* (2013.01); *G05B 19/406* (2013.01); *G05B 19/4061* (2013.01); *G05B 2219/35446* (2013.01); *G05B 2219/40202* (2013.01); *G05B 2219/40203* (2013.01); *G05B 2219/42272* (2013.01); *G05B 2219/50177* (2013.01)

(58) Field of Classification Search
CPC ........ B25J 9/1676; B25J 19/061; B25J 19/06; B25J 9/1674; F16P 3/147; G05B 19/4061; G05B 19/406; G05B 2219/35446; G05B 2219/40202; G05B 2219/40203

See application file for complete search history.

(56) References Cited

U.S. PATENT DOCUMENTS

| 3,934,100 A | 1/1976 | Harada |
| 4,150,262 A | 4/1979 | Ono |
| 4,334,315 A | 6/1982 | Ono et al. |
| 4,375,016 A | 2/1983 | Harada |
| 4,588,867 A | 5/1986 | Konomi |

(Continued)

FOREIGN PATENT DOCUMENTS

| DE | 202014100411 U1 | 5/2015 |
| EP | 1017252 A2 | 7/2000 |

(Continued)

OTHER PUBLICATIONS

Announcing the $3,333,333 Stretch Goal (Feb. 24, 2014).

(Continued)

*Primary Examiner* — Adam R Mott
(74) *Attorney, Agent, or Firm* — Goodhue, Coleman & Owens, P.C.

(57) ABSTRACT

A system for increasing safety during robot-human collaborations in a manufacturing environment is provided. The method includes at least one wearable device for use by a human worker and an industrial robot in operative communication with the at least one wearable device. The industrial robot is equipped to detect location of the human worker using the at least one wearable device. The at least one wearable device may include an earpiece. The at least one wearable device may include a set of earpieces including a left wearable earpiece and a right wearable earpiece.

14 Claims, 4 Drawing Sheets

(56) References Cited

U.S. PATENT DOCUMENTS

| | | |
|---|---|---|
| 4,654,883 A | 3/1987 | Iwata |
| 4,682,180 A | 7/1987 | Gans |
| 4,791,673 A | 12/1988 | Schreiber |
| 4,865,044 A | 9/1989 | Wallace et al. |
| 5,191,602 A | 3/1993 | Regen et al. |
| 5,201,007 A | 4/1993 | Ward et al. |
| 5,280,524 A | 1/1994 | Norris |
| 5,295,193 A | 3/1994 | Ono |
| 5,298,692 A | 3/1994 | Ikeda et al. |
| 5,343,532 A | 8/1994 | Shugart |
| 5,363,444 A | 11/1994 | Norris |
| 5,497,339 A | 3/1996 | Bernard |
| 5,606,621 A | 2/1997 | Reiter et al. |
| 5,613,222 A | 3/1997 | Guenther |
| 5,692,059 A | 11/1997 | Kruger |
| 5,721,783 A | 2/1998 | Anderson |
| 5,749,072 A | 5/1998 | Mazurkiewicz et al. |
| 5,771,438 A | 6/1998 | Palermo et al. |
| 5,802,167 A | 9/1998 | Hong |
| 5,929,774 A | 7/1999 | Charlton |
| 5,933,506 A | 8/1999 | Aoki et al. |
| 5,949,896 A | 9/1999 | Nageno et al. |
| 5,987,146 A | 11/1999 | Pluvinage et al. |
| 6,021,207 A | 2/2000 | Puthuff et al. |
| 6,054,989 A | 4/2000 | Robertson et al. |
| 6,081,724 A | 6/2000 | Wilson |
| 6,094,492 A | 7/2000 | Boesen |
| 6,111,569 A | 8/2000 | Brusky et al. |
| 6,112,103 A | 8/2000 | Puthuff |
| 6,157,727 A | 12/2000 | Rueda |
| 6,167,039 A | 12/2000 | Karlsson et al. |
| 6,181,801 B1 | 1/2001 | Puthuff et al. |
| 6,208,372 B1 | 3/2001 | Barraclough |
| 6,275,789 B1 | 8/2001 | Moser et al. |
| 6,339,754 B1 | 1/2002 | Flanagan et al. |
| 6,408,081 B1 | 6/2002 | Boesen |
| D464,039 S | 10/2002 | Boesen |
| 6,470,893 B1 | 10/2002 | Boesen |
| D468,299 S | 1/2003 | Boesen |
| D468,300 S | 1/2003 | Boesen |
| 6,542,721 B2 | 4/2003 | Boesen |
| 6,560,468 B1 | 5/2003 | Boesen |
| 6,654,721 B2 | 11/2003 | Handelman |
| 6,664,713 B2 | 12/2003 | Boesen |
| 6,694,180 B1 | 2/2004 | Boesen |
| 6,718,043 B1 | 4/2004 | Boesen |
| 6,738,485 B1 | 5/2004 | Boesen |
| 6,748,095 B1 | 6/2004 | Goss |
| 6,754,358 B1 | 6/2004 | Boesen et al. |
| 6,784,873 B1 | 8/2004 | Boesen et al. |
| 6,823,195 B1 | 11/2004 | Boesen |
| 6,852,084 B1 | 2/2005 | Boesen |
| 6,879,698 B2 | 4/2005 | Boesen |
| 6,892,082 B2 | 5/2005 | Boesen |
| 6,920,229 B2 | 7/2005 | Boesen |
| 6,952,483 B2 | 10/2005 | Boesen et al. |
| 6,987,986 B2 | 1/2006 | Boesen |
| 7,136,282 B1 | 11/2006 | Rebeske |
| 7,203,331 B2 | 4/2007 | Boesen |
| 7,209,569 B2 | 4/2007 | Boesen |
| 7,215,790 B2 | 5/2007 | Boesen et al. |
| 7,463,902 B2 | 12/2008 | Boesen |
| 7,508,411 B2 | 3/2009 | Boesen |
| 7,983,628 B2 | 7/2011 | Boesen |
| 8,140,357 B1 | 3/2012 | Boesen |
| 2001/0005197 A1 | 6/2001 | Mishra et al. |
| 2001/0027121 A1 | 10/2001 | Boesen |
| 2001/0056350 A1 | 12/2001 | Calderone et al. |
| 2002/0002413 A1 | 1/2002 | Tokue |
| 2002/0007510 A1 | 1/2002 | Mann |
| 2002/0010590 A1 | 1/2002 | Lee |
| 2002/0030637 A1 | 3/2002 | Mann |
| 2002/0046035 A1 | 4/2002 | Kitahara et al. |
| 2002/0057810 A1 | 5/2002 | Boesen |
| 2002/0076073 A1 | 6/2002 | Taenzer et al. |
| 2002/0118852 A1 | 8/2002 | Boesen |
| 2003/0065504 A1 | 4/2003 | Kraemer et al. |
| 2003/0100331 A1 | 5/2003 | Dress et al. |
| 2003/0104806 A1 | 6/2003 | Ruef et al. |
| 2003/0115068 A1 | 6/2003 | Boesen |
| 2003/0125096 A1 | 7/2003 | Boesen |
| 2003/0218064 A1 | 11/2003 | Conner et al. |
| 2004/0070564 A1 | 4/2004 | Dawson et al. |
| 2004/0160511 A1 | 8/2004 | Boesen |
| 2005/0043056 A1 | 2/2005 | Boesen |
| 2005/0125320 A1 | 6/2005 | Boesen |
| 2005/0148883 A1 | 7/2005 | Boesen |
| 2005/0165663 A1 | 7/2005 | Razumov |
| 2005/0196009 A1 | 9/2005 | Boesen |
| 2005/0251455 A1 | 11/2005 | Boesen |
| 2005/0266876 A1 | 12/2005 | Boesen |
| 2006/0029246 A1 | 2/2006 | Boesen |
| 2006/0074671 A1 | 4/2006 | Farmaner et al. |
| 2006/0074808 A1 | 4/2006 | Boesen |
| 2008/0254780 A1 | 10/2008 | Kuhl et al. |
| 2009/0017881 A1 | 1/2009 | Madrigal |
| 2009/0072631 A1* | 3/2009 | Iida .................... B25J 19/06 307/326 |
| 2010/0320961 A1 | 12/2010 | Castillo et al. |
| 2011/0286615 A1 | 11/2011 | Olodort et al. |
| 2014/0270227 A1 | 9/2014 | Swanson |
| 2014/0277726 A1* | 9/2014 | Nakamura ............. B25J 9/1676 700/255 |
| 2016/0062345 A1* | 3/2016 | Stubbs ..................... B25J 5/00 701/2 |
| 2016/0274586 A1* | 9/2016 | Stubbs ............... G06K 7/10366 |

FOREIGN PATENT DOCUMENTS

| | | |
|---|---|---|
| EP | 1435737 A1 | 7/2004 |
| EP | 2903186 A1 | 8/2015 |
| EP | 2783811 A3 | 4/2016 |
| GB | 2074817 | 4/1981 |
| JP | S61173886 A | 8/1986 |
| JP | 06292195 | 10/1998 |
| JP | 2006043862 A | 2/2006 |
| KR | 20050006702 A | 1/2005 |
| WO | 2011085441 A1 | 7/2011 |
| WO | 2014043179 A2 | 3/2014 |
| WO | 2015110577 A1 | 7/2015 |
| WO | 2015110587 A1 | 7/2015 |

OTHER PUBLICATIONS

BRAGI is on Facebook (2014).
BRAGI Update—Arrival of Prototype Chassis Parts—More People—Awesomeness (May 13, 2014).
BRAGI Update—Chinese New Year, Design Verification, Charging Case, More People, Timeline(Mar. 6, 2015).
BRAGI Update—First Sleeves From Prototype Tool—Software Development Kit (Jun. 5, 2014).
BRAGI Update—Let's Get Ready to Rumble, A Lot to Be Done Over Christmas (Dec. 22, 2014).
BRAGI Update—Memories From April—Update on Progress (Sep. 16, 2014).
BRAGI Update—Memories from May—Update on Progress—Sweet (Oct. 13, 2014).
BRAGI Update—Memories From One Month Before Kickstarter—Update on Progress (Jul. 10, 2014).
BRAGI Update—Memories From the First Month of Kickstarter—Update on Progress (Aug. 1, 2014).
BRAGI Update—Memories From the Second Month of Kickstarter—Update on Progress (Aug. 22, 2014).
BRAGI Update—New People @BRAGI—Prototypes (Jun. 26, 2014).
BRAGI Update—Office Tour, Tour to China, Tour to CES (Dec. 11, 2014).
BRAGI Update—Status on Wireless, Bits and Pieces, Testing—Oh Yeah, Timeline(Apr. 24, 2015).
BRAGI Update—The App Preview, The Charger, The SDK, BRAGI Funding and Chinese New Year (Feb. 11, 2015).

(56) References Cited

OTHER PUBLICATIONS

BRAGI Update—What We Did Over Christmas, Las Vegas & CES (Jan. 19, 2014).
BRAGI Update—Years of Development, Moments of Utter Joy and Finishing What We Started(Jun. 5, 2015).
BRAGI Update—Alpha 5 and Back to China, Backer Day, on Track(May 16, 2015).
BRAGI Update—Beta2 Production and Factory Line(Aug. 20, 2015).
BRAGI Update—Certifications, Production, Ramping Up.
BRAGI Update—Developer Units Shipping and Status(Oct. 5, 2015).
BRAGI Update—Developer Units Started Shipping and Status (Oct. 19, 2015).
BRAGI Update—Developer Units, Investment, Story and Status(Nov. 2, 2015).
BRAGI Update—Getting Close(Aug. 6, 2014).
BRAGI Update—On Track, Design Verification, How It Works and What's Next(Jul. 15, 2015).
BRAGI Update—On Track, on Track and Gems Overview.
BRAGI Update—Status on Wireless, Supply, Timeline and Open House@BRAGI(Apr. 1, 2015).
BRAGI Update—Unpacking Video, Reviews on Audio Perform and Boy Are We Getting Close(Sep. 10, 2015).
Last Push Before The Kickstarter Campaign Ends on Monday 4pm CET (Mar. 28, 2014).
STAAB, Wayne J., et al., "A One-Size Disposable Hearing Aid is Introduced", The Hearing Journal 53(4):36-41) Apr. 2000.
Stretchgoal—It's Your Dash (Feb. 14, 2014).
Stretchgoal—The Carrying Case for the Dash (Feb. 12, 2014).
Stretchgoal—Windows Phone Support (Feb. 17, 2014).
The Dash + The Charging Case & The BRAGI News (Feb. 21, 2014).
The Dash—A Word From Our Software, Mechanical and Acoustics Team + An Update (Mar. 11, 2014).
Update From BRAGI—$3,000,000—Yipee (Mar. 22, 2014).
International Search Report & Written Opinion, PCT/EP16/79226, (dated Jun. 29, 2017), 27 Pages.

* cited by examiner

ROBOTIC SAFETY USING WEARABLES

PRIORITY STATEMENT

This application claims priority to U.S. Provisional Patent Application 62/261,779, filed on Dec. 1, 2015, and entitled Robotic safety using wearables, hereby incorporated by reference in its entirety.

FIELD OF THE INVENTION

The present invention relates to wearable devices. More particularly, but not exclusively, the present invention relates to the use of wearable devices to improve robotic safety.

BACKGROUND

Robotic automation can provide for increasing overall productivity and efficiency. However, in many manufacturing contexts both robots and workers may work alongside each other to provide human robot collaboration.

For example, consider automotive manufacturing where industrial robots and human workers may work together on a production line. Industrial robots such as industrial robotic arms may be used to perform various assembly tasks. However other tasks remain human tasks. One of the problems associated with such environments is safety. Various robot manufacturing equipment can exert tremendous force which has the potential to harm human workers. Therefore, what is needed are methods and systems which enhance safety during robot-human collaborations, especially in manufacturing facilties.

SUMMARY

Therefore, it is a primary object, feature, or advantage of the present invention to improve over the state of the art.

It is a further object, feature, or advantage of the present invention to improve safety of human workers in manufacturing environments where humans and robots collaborate.

It is a still further object, feature, or advantage of the present invention to allow robots to locate human collaborators.

Another object, feature, or advantage is to stop, attenuate, or reverse motion of a robot in order to protect a human worker.

One or more of these and for other objects, features, or advantages of the present invention will become apparent from the specification and claims that follow. No single embodiment need provide each and every object, feature, or advantage. Different embodiments may have different objects, features, or advantages. Therefore, the present invention is not to be limited to or by an objects, features, or advantages stated herein.

According to one aspect, a system for increasing safety during robot-human collaborations in a manufacturing environment is provided. The method includes at least one wearable device for use by a human worker and an industrial robot in operative communication with the at least one wearable device. The industrial robot is equipped to detect location of the human worker using the at least one wearable device. The at least one wearable device may include an earpiece. The at least one wearable device may include a set of earpieces including a left wearable earpiece and a right wearable earpiece. The system may include a wearable housing, a processor disposed within the wearable housing, a transceiver disposed within the wearable housing and operatively connected to the processor, and one or more sensors operatively connected to the processor. The one or more sensors includes at least one inertial sensor. The processor may be configured to track changes in movement of the human worker using the at least one inertial sensor and communicate position or changes in movement of the human worker to the industrial robot using the transceiver. The industrial robot is configured to avoid contact with the human worker by stopping. The industrial robot may be configured to avoid contact with the human worker by changing direction of motion. The industrial robot may be configured to reduce force of contact with the human worker. The industrial robot may include a robotic arm. The at least one wearable device may include at least one sensor for detecting position of the industrial robot.

According to another aspect, a method for increasing safety during robot-human collaborations in a manufacturing environment is provided. The method may include providing a wearable device, providing an industrial robot, determining relative position between the wearable device and the industrial robot, and altering operation of the industrial robot when the relative position between the wearable device and the industrial robot is less than a threshold. The altering the operation of the industrial robot may include stopping the industrial robot or changing direction of motion of the industrial robot or the amount of force produced by the robot. The method may also provide for producing an audible alert at the wearable device when the relative position between the wearable device and the industrial robot is less than the threshold. The method may further include producing a sound at the wearable device wherein the sound is shaped to represent a spatial location of the industrial robot relative to the wearable device.

According to another aspect, a system for increasing safety during robot-human collaborations in a manufacturing environment is provided. The system includes at least one wearable device for use by a human worker and an industrial robot in operative communication with the at least one wearable device. The at least one wearable device is configured to detect location of the industrial robot. The at least one wearable device may be an earpiece. The earpiece may include an earpiece housing, a processor disposed within the earpiece housing, and at least one sensor operatively connected to the processor. The at least one sensor may be configured to detect location of the industrial robot by emitting a field and detecting when the industrial robot enters the field. The earpiece may further includes a speaker and the processor may be configured to determine where within the field the industrial robot is located and to produce a sound at the speaker to alert the human worker of the position of the industrial robot.

DETAILED DESCRIPTION

Robots used in manufacturing can provide a significant risk to humans who work near them particularly in the industrial setting such as in the manufacturing of vehicles or other products. Although generally described in the context of industrial manufacturing, it is to be understood that the present invention may be used in other contexts as well.

Figure 1:
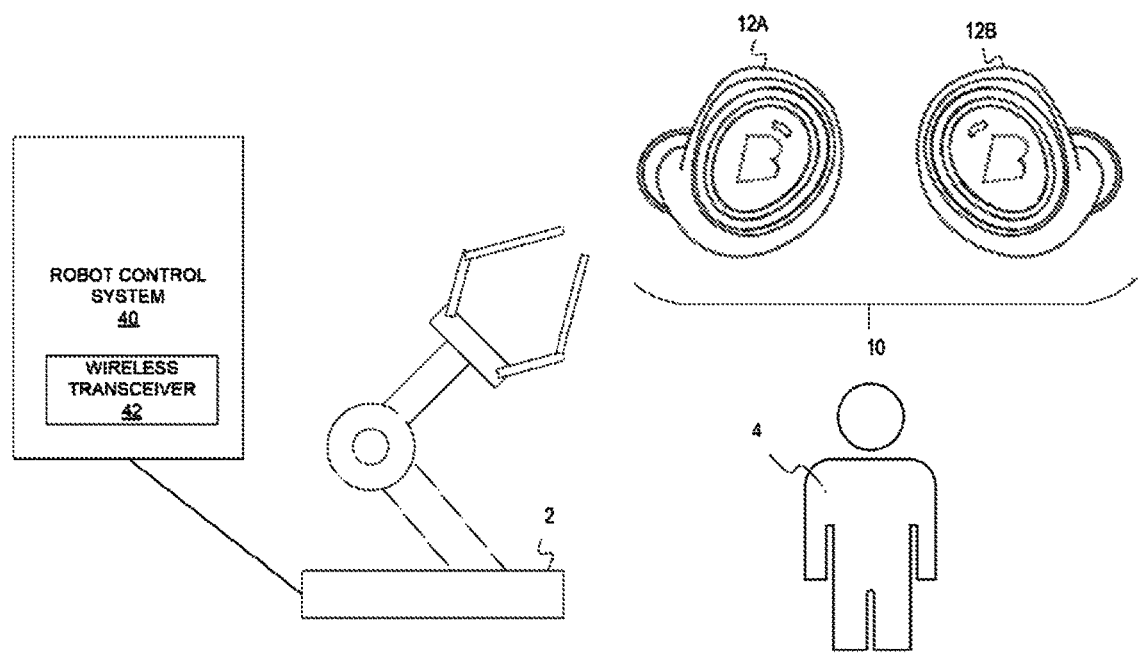
FIG. 1 illustrates one example of a system for enhancing safety during robot-human collaborations in manufacturing.

FIG. 1 illustrates one example of use of a wearable device in conjunction with a robot 2 which is operatively connected to or in operative communication with a robot control system 40. The robot control system 40 may be linked to any number of different industrial or manufacturing controls or systems including those associated with one or more assembly lines. One or more wearable devices such as a set of earpieces 10 including a left earpiece 12A and a right earpiece 12B. The wearable device(s) 10 may be in operative communication with the robot control system 40 such as through a communication system having a wireless transceiver 42 associated with the robot control system 40. For example, the wireless transceiver 42 may provide a Bluetooth or BLE link or Wi-Fi or other radio link to the wearable devices 10 or may otherwise provide for communications with the wearable devices 10 through wireless communications. The robot control system 40 may communicate with the wearable device(s) 10 directly, or alternatively, or in addition, the robot control system 40 may communicate with the wearable device(s) through an intermediary device or otherwise indirectly.

As will be explained in further details with respect to various examples, the wearable device(s) 10 interact with the robot control system 40 in any number of different ways. For example, the wearable device(s) 10 may provide sensor data to the robot control system. Based on this information, the robot 2 may take any number of actions which may include one or more actions such as stopping movement of the robot, changing direction of movement of the robot, decreasing the amount of force exerted by the robot, or other types of actions.

Figure 2:
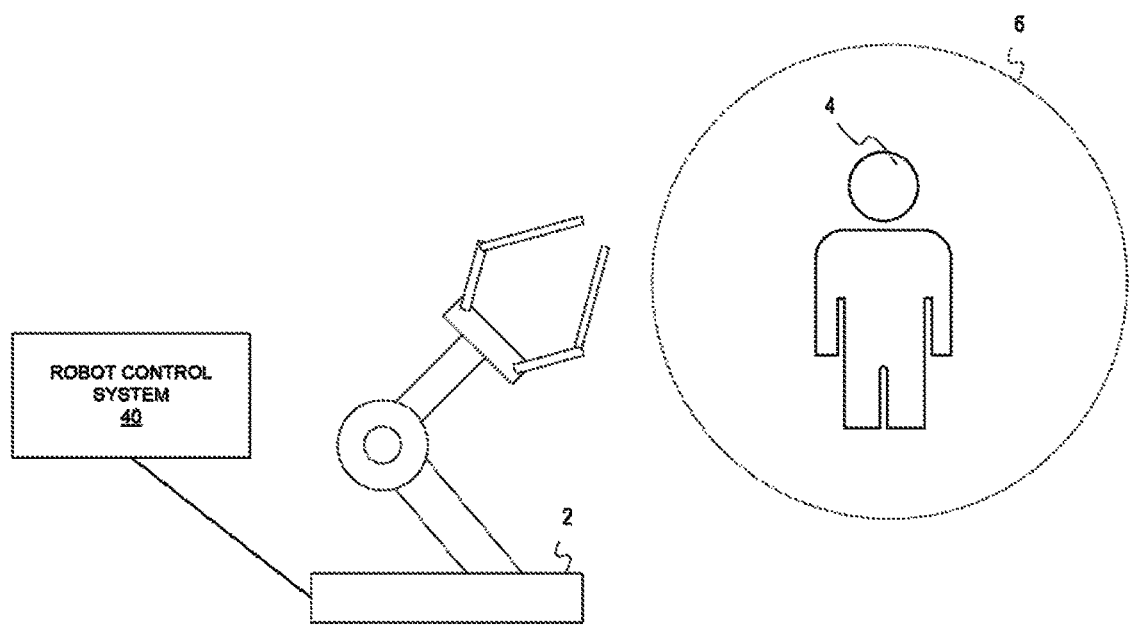
FIG. 2 illustrates another example of a system for enhancing safety during robot-human collaborations in manufacturing.

FIG. 2 illustrates another example of a system for enhancing safety during robot-human collaborations. As shown in FIG. 2, there is a field 6 surrounding an individual. The field 6 may be generated by one or more wearable devices and may be an electromagnetic field. The field may be a capacitive field or an ultrasonic field. One or more emitters may be used to generate a field and one more detectors may be used to detect disturbances within the field. Where multiple wearable devices are present there may be more than one field present. The field 6 once generated may be used in several ways. First, a disruption of the field 6 may be used to indicate that the robot is located in or may be located within the field. When this occurs, the wearable device may communicate a message to the robot 2. The message may indicate that the robot 2 should reverse its motion, stop, slow down, use less force, or otherwise alter its operation as a safety precaution. The message may be communicated in any number of formats using any number of protocols and any number of different communication channels.

In addition, the wearable device may communicate information to the worker. For example, where the wearable device is an earpiece or where there are a set of earpieces, an audible alert may be communicated to the worker to alert the worker 4 of the proximity of the robot 2. The closer the robot 2, the louder the sound may be. In addition, the sounds produced by the earpiece may be three-dimensionally shaped so that the worker perceives the sound as coming from a particular location associated with the actual location of the robot.

Figure 3:
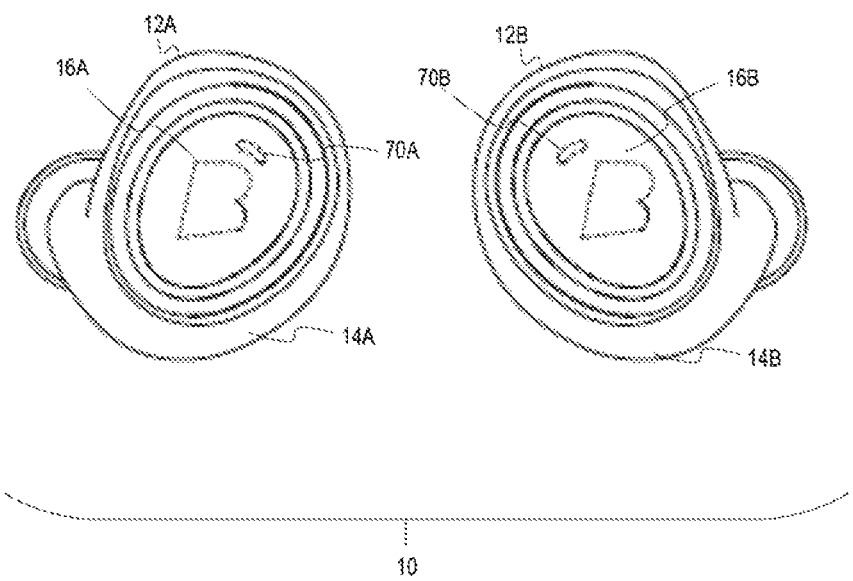
FIG. 3 illustrates a set of wearable earpieces for use in improving safety.

FIG. 3 illustrates one example of a wearable device in the form of a set of ear pieces 10 in greater detail. FIG. 3 illustrates a set of earpiece wearables 10 which includes a left earpiece 12A and a right earpiece 12B. Each of the earpieces wearables 12A, 12B has an earpiece wearable housing 14A, 14B which may be in the form of a protective shell or casing and may be an in-the-ear earpiece housing. A left infrared through ultraviolet spectrometer 16A and right infrared through ultraviolet spectrometer 16B is also shown. Each earpiece 12A, 12B may include one or more microphones 70A, 70B. Note that the air microphones 70A, 70B are outward facing such that the air microphones 70A, 70B may capture ambient environmental sound. It is to be understood that any number of microphones may be present including air conduction microphones, bone conduction microphones, or other audio sensors.

Figure 4:
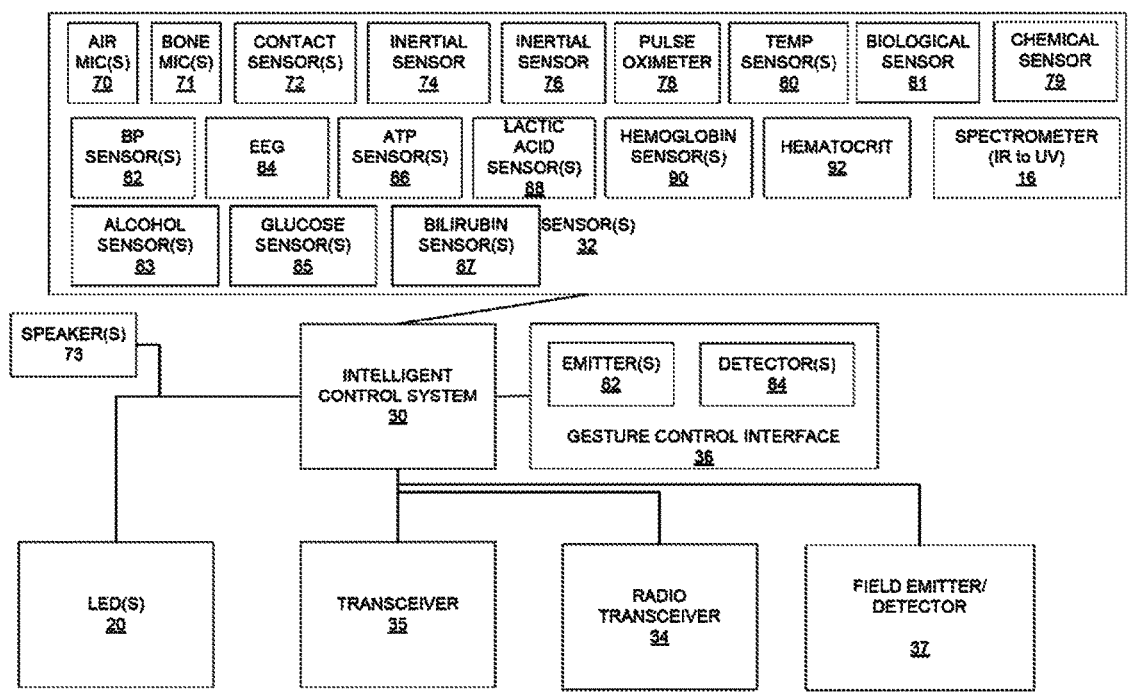
FIG. 4 illustrates a block diagram one example of an earpiece.

FIG. 4 is a block diagram illustrating a device. The device may include one or more LEDs 20 electrically connected to an intelligent control system 30. The intelligent control system 30 may include one or more processors microcontrollers, application specific integrated circuits, or other types of integrated circuits. The intelligent control system 30 may also be electrically connected to one or more sensors 32. Where the device is an earpiece, the sensor(s) may include an inertial sensor 74, another inertial sensor 76. Each inertial sensor 74, 76 may include an accelerometer, a gyro sensor or pyrometer, a magnetometer or other type of inertial sensor. The inertial sensors may be used track movement of the worker which may be communicated to the robot control system.

Thus, a robot may track movement of a human worker who is wearing one or more wearable devices. This may be accomplished by calibrating the position of the human worker relative to the robot and then tracking changes in movement of the human worker by examining sensor data associated with one or more of the inertial sensors. Thus, as the person moves and inertial sensor data is reported, the robot and/or its control system may update the location of the person relative to the robot.

The sensor(s) 32 may also include one or more contact sensors 72, one or more bone conduction microphones 71, one or more air conduction microphones 70, one or more chemical sensors 79, a pulse oximeter 76, a temperature sensor 80, or other physiological or biological sensor(s). Further examples of physiological or biological sensors include an alcohol sensor 83, glucose sensor 85, or bilirubin sensor 87. Other examples of physiological or biological sensors may also be included in the device. These may include a blood pressure sensor 82, an electroencephalogram (EEG) 84, an Adenosine Triphosphate (ATP) sensor, a lactic acid sensor 88, a hemoglobin sensor 90, a hematocrit sensor 92 or other biological or chemical sensor. The various sensors shown may be used to collect information regarding worker health to further improve worker safety by alerting the worker or others when a health issue is determined.

A spectrometer 16 is also shown. The spectrometer 16 may be an infrared (IR) through ultraviolet (UV) spectrometer although it is contemplated that any number of wavelengths in the infrared, visible, or ultraviolet spectrums may be detected. The spectrometer 16 is preferably adapted to measure environmental wavelengths for analysis and recommendations and thus preferably is located on or at the external facing side of the device.

A gesture control interface 36 is also operatively connected to or integrated into the intelligent control system 30. The gesture control interface 36 may include one or more emitters 82 and one or more detectors 84 for sensing user gestures. The emitters may be of any number of types including infrared LEDs. The device may include a transceiver 35 which may allow for induction transmissions such as through near field magnetic induction. A short range transceiver 34 using Bluetooth, BLE, UWB, or other means of radio communication may also be present. The short range transceiver 34 may be used to communicate with the vehicle control system. In operation, the intelligent control system 30 may be configured to convey different information using one or more of the LED(s) 20 based on context or mode of operation of the device. The various sensors 32, the processor 30, and other electronic components may be located on the printed circuit board of the device. One or more speakers 73 may also be operatively connected to the intelligent control system 30.

It is to also be understood that the same sensors or types of sensor used for the gesture control interface 36 may be used in creating a field surrounding a wearable device and detect intrusions into the field such as from a robot. Thus, LEDs, ultrasound, capacitive, or other fields may be created which extend outwardly from a wearable device associated with a worker to detect the presence of a robot.

A field emitter and detector may also be operatively connected to the intelligent control system 30 to generate an electromagnetic field or other type of field surrounding a user which a robot would interfere with if the robot was too close to the user. Disruptions in the field may be emitted and then detected at the field emitter/detector 37 and communicated to and interpreted by the intelligent control system 30. For purposes of determining changes in a field, it is contemplated that other types of fields may be used such as capacitive fields or ultrasonic fields or other types of fields which may be disrupted by the presence of a robot nearby.

In some embodiments there are multiple ways to track relative positions of the person wearing the wearable device and the manufacturing robot. For example, the earpiece may use inertial sensor measurements to keep track of position which may be communicated to the industrial robot. In addition, the earpiece may monitor changes in a field associated with the user in order to determine position of the industrial robot. This provides additional safeguards to assist in preventing accidents and injuries and thus is a further advantage. Also, where a person wears multiple wearable devices (such as two earpieces), additional tracking may be performed independent for each wearable device.

The earpieces shown have additional utility in a manufacturing environment. For example, where there are loud noises it may be beneficial to wear the earpieces to protect a worker from the loud noises. Here, the earpieces may be configured to capture and reproduce ambient sounds to the operator. This may be accomplished by using one or more microphones on the earpieces to detect ambient sound and then to re-create the ambient sound at one or more speakers of the earpiece. Thus, even though the operator is wearing earpieces there is audio transparency. In addition, as previously explained, because the earpieces may be inserted into the external auditory canal, speakers within the earpiece may be used to allow sound to be shaped so that the sounds are perceived three-dimensionally.

Therefore various apparatus, methods, and systems have been shown and described for improving worker safety, particularly when humans are working collaboratively with robots. It should be appreciated, however, that various apparatus, methods, and systems may be used in other applications and other environments.

What is claimed is:

1. A system for increasing safety during robot-human collaborations in a manufacturing environment, the system comprising:
    at least one wireless earpiece for use by a human worker; and
    an industrial robot in operative communication with the at least one wireless earpiece;
    wherein the industrial robot is equipped to detect a location of the human worker using data from the at least one wireless earpiece;
    wherein the industrial robot is configured to update the location of the human worker relative to the industrial robot;
    wherein the wireless earpiece comprises a wearable housing, a processor disposed within the wearable housing, and a speaker operatively connected to the wearable housing and the processor;
    wherein the wireless earpiece is configured to produce a sound at the speaker when the location between the wireless earpiece and the industrial robot is less than a threshold; and
    wherein the sound is shaped to represent a spatial location of the industrial robot relative to the wireless earpiece.

2. The system of claim 1 wherein the at least one wireless earpiece comprises a set of wireless earpieces including a left wireless earpiece and a right wireless earpiece.

3. The system of claim 1 wherein each wireless earpiece further comprises:
    a transceiver disposed within the wearable housing and operatively connected to the processor and
    at least one sensor operatively connected to the processor.

4. The system of claim 3 wherein the at least one sensor further comprises an inertial sensor.

5. The system of claim 4 wherein the processor is configured to track changes in movement associated with the human worker using inertial sensor data from the inertial sensor and communicate position or changes in movement of the human worker to the industrial robot using the transceiver.

6. The system of claim 1 wherein the industrial robot is configured to avoid contact with the human worker by stopping.

7. The system of claim 1 wherein the industrial robot is configured to avoid contact with the human worker by changing direction of motion.

8. The system of claim 1 wherein the industrial robot is configured to reduce force of contact with the human worker.

9. The system of claim 1 wherein the at least one wireless earpiece comprises at least one sensor for detecting a position of the industrial robot.

10. A method for increasing safety during robot-human collaborations in a manufacturing environment, the method comprising:
    receiving data associated with a position of a human worker wearing a wireless earpiece;
    determining, using the data, a relative position between the wireless earpiece and an industrial robot;
    communicating information to alter an operation of the industrial robot when the relative position between the wireless earpiece and the industrial robot is less than a threshold; and
    producing a sound at the wireless earpiece when the relative position between the wireless earpiece and the industrial robot is less than the threshold, wherein the sound is shaped to represent a spatial location of the industrial robot relative to the wireless earpiece.

11. The method of claim 10 wherein the altering operation of the industrial robot comprises stopping the industrial robot.

12. The method of claim 10 wherein the altering operation of the industrial robot comprises changing direction of motion of the industrial robot.

13. A system for increasing safety during robot-human collaborations in a manufacturing environment, the system comprising:
- at least one wireless earpiece for use by a human worker; and
- an industrial robot in operative communication with the at least one wireless earpiece;
- wherein the wireless earpiece comprises a wearable housing, a processor disposed within the wearable housing, at least one sensor operatively connected to the processor, and a speaker operatively connected to the wearable housing and the processor;
- wherein the at least one wireless earpiece is configured to detect a location of the industrial robot using data sensed by the at least one sensor;
- wherein the wireless earpiece is configured to produce a sound when the location between the wireless earpiece and the industrial robot is less than a threshold; and
- wherein the sound is shaped to represent a spatial location of the industrial robot relative to the wireless earpiece.

14. The system of claim 13 wherein the at least one sensor is configured to detect the location of the industrial robot by emitting a field and detecting when the industrial robot enters the field.

* * * * *